United States Patent [19]
Stark

[11] Patent Number: 5,058,968
[45] Date of Patent: Oct. 22, 1991

[54] OPTICAL SCANNER FOR MAINTAINING FOCUS OVER A FLAT IMAGE PLANE

[75] Inventor: Richard A. Stark, Rochester, N.Y.

[73] Assignee: Eastman Kodak Company, Rochester, N.Y.

[21] Appl. No.: 566,194

[22] Filed: Aug. 13, 1990

[51] Int. Cl.$^5$ .............................................. G02B 26/08
[52] U.S. Cl. ................................................. 359/213
[58] Field of Search ................. 350/6.1, 6.3, 6.4–6.6, 350/6.91; 250/236

[56] References Cited

U.S. PATENT DOCUMENTS

| | | | |
|---|---|---|---|
| 3,222,453 | 12/1965 | Whitesell et al. | 350/6.6 |
| 3,468,229 | 9/1969 | Bellows | 354/95 |
| 4,155,620 | 5/1979 | Rawson | 350/6.6 |
| 4,293,184 | 10/1981 | Minoura et al. | 350/6.3 |
| 4,410,233 | 10/1983 | Gerhardt et al. | 350/6.6 |
| 4,511,205 | 4/1985 | Crane | 350/6.1 |
| 4,553,028 | 11/1985 | Reust | 250/236 |
| 4,725,127 | 2/1988 | Malinge et al. | 350/26.9 |
| 4,764,002 | 8/1988 | Wilson | 350/6.6 |
| 4,919,499 | 4/1990 | Aiba | 350/6.6 |

Primary Examiner—Bruce Y. Arnold
Assistant Examiner—James Phan
Attorney, Agent, or Firm—Dennis R. Arndt

[57] ABSTRACT

An optical scanning system of the type in which an oscillating mirror located between the focusing lens and the image plane is provided to scan the reflected optical axis of a focusing lens across a flat field, wherein the pivot axis of the mirror is translated during oscillation of the mirror. The pivot axis of the mirror is translated at an angle of 45° with respect to the optical axis of the focusing lens thereby enabling the mirror to be translated at a uniform velocity during scanning to provide a uniform velocity scan.

4 Claims, 5 Drawing Sheets

OPTICAL SCANNER FOR MAINTAINING FOCUS OVER A FLAT IMAGE PLANE

TECHNICAL FIELD

The present invention relates to optical scanning apparatus and more particularly to optical scanning apparatus employing an oscillating mirror that is moved in such a way as to maintain focus over an extended flat image plane.

BACKGROUND ART

In many optical scanning systems an oscillating mirror is employed between a focusing lens and an image plane to scan the optical axis of the focusing lens across the image plane. Such apparatus may be employed for example to provide the relatively slow page scan in a raster scan apparatus where the relatively fast line scan in provided by a rotating polygon or hologon scanner.

A major problem associated with such an oscillating mirror scanner is that as the mirror is rotated, the point of focus of the optical system defines a circular arc that does not lie in a plane. For example, if the mirror pivots or rotates about a fixed axis lying in the plane of the mirror, the point of focus will describe a circular arc that will intersect the plane of focus, at most at only 2 points.

One solution is to rotate the mirror about an external pivot point (see U.S. Pat. No. 4,155,620 issued May 22, 1979 to Rawson). By locating the external pivot point correctly, at most three locations along the scan line can be kept in focus, for example, the mid-point of the scan and two points near the ends of the scan. However, focus error occurs between these points.

To maintain focus across an entire scan, the oscillating mirror must both rotate and have its pivot point translate during the scan (see U.S. Pat. No. 3,222,453 issued Dec. 7, 1965 to Whitesell). In the arrangement described by Whitesell, the pivot point of the mirror axis is translated in a direction parallel with the optical axis of the lens. This requires that the mirror be moved in nonlinear reciprocating motion. To provide this motion, a precision ground cam is required, that is difficult and expensive to produce.

DISCLOSURE OF THE INVENTION

It is therefore an object of the present invention to provide an improved optical scanning apparatus of the type having an oscillating mirror that overcomes the problems noted above. The object is achieved according to the present invention by providing means for translating the axis of rotation of the mirror along a path lying at an angle of 45° to the optical axis of the focusing lens. In a preferred embodiment, the mirror is mounted on a carriage that rides on a track angled at 45° to the the optical axis of the focusing lens, and a cam connected to the axis of the mirror provides the rotation of the mirror while the carriage is translated at a constant velocity along the track.

MODES OF CARRYING OUT THE INVENTION

Figure 1:
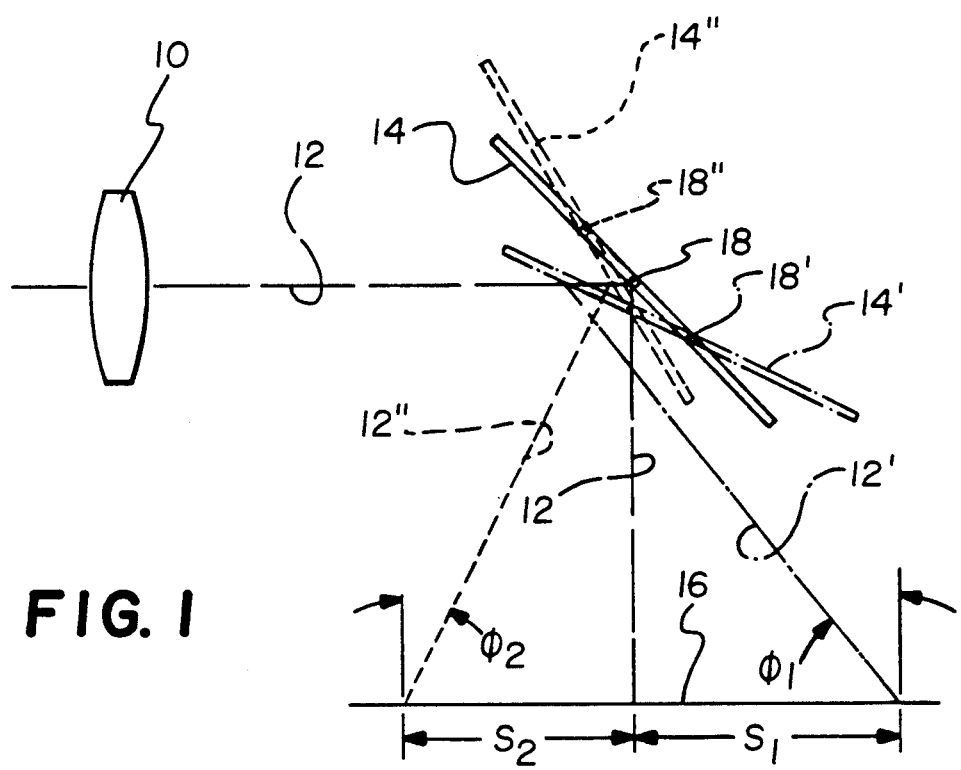
FIG. 1 is a schematic diagram illustrating the principle of operation of apparatus according to the present invention.

Referring to FIG. 1, apparatus for scanning according to the present invention is shown schematically. The apparatus includes a focusing lens 10 defining an optical axis 12, and a scanning mirror 14 for deflecting the optical axis 12 of the focusing lens 10 to a flat image plane 16. The scanning mirror 14 is rotated about a pivot axis 18 to scan the image plane. During rotation, pivot axis 18 is translated at a uniform velocity along a path oriented at 45° to the optical axis 12. By translating the pivot axis at a uniform velocity along the 45° path, a flat field constant velocity scan is achieved. FIG. 1 shows the mirror 14 in phantom at the beginning of a scan (14') and the end of a scan (14") with the respective locations of the pivot axis (18') and (18") shown along the 45° path.

Such apparatus can be provided to either scan a light beam onto image plane 16, or to scan an image in image plane 16 for a detector located on the other side of lens 10.

As described above, during the scanning operation, the pivot axis 18 moves along the 45° path at a constant velocity as the scan mirror 14 rotates clockwise. At the beginning of the scan, the pivot is located at 18' and the reflected optical axis is 12' as shown in FIG. 1. As scanning commences to the mid-point of the scan, the pivot axis advances at a constant velocity to position 18 and the optical axis 12 is perpendicular to the image plane 16. As scanning continues to the end point of the scan, the scan mirror 14 continues to rotate clockwise and the pivot axis continues to move at a constant velocity to the point 18" deflecting the optical axis to the position 12" as shown in FIG. 1.

Figure 2:
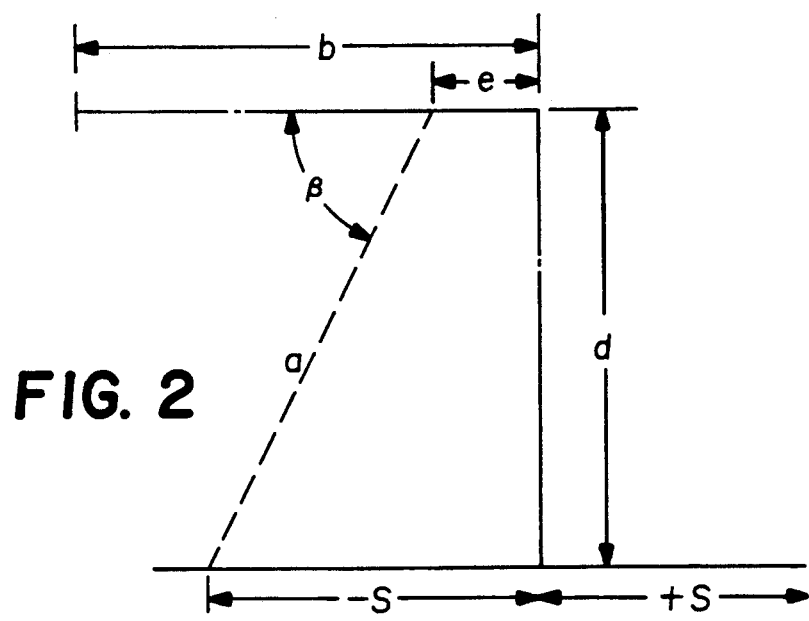
FIG. 2 is a geometric diagram showing the geometry that aids in describing how focus is maintained as a flat field in the image plane.

The motion of the mirror 14 will now be described geometrically with reference to diagrams in FIGS. 2–4. In FIG. 2, b represents the distance from the focusing lens 10 to the mirror surface 14 at the point where the reflected optical axis is normal to the image plane 16 and d represents the distance from the optical axis 12 before reflection from mirror 14 to the image plane 16. At any point in the scan, the distance from the point of reflection on the mirror surface to the image plane is designated by a, and the distance along the optical axis that the mirror surface moves is denoted by e.

As can be seen from the diagram in FIG. 2, the scan will remain in focus if:

$$b + d = (b - e) + a, \text{ or} \qquad (1)$$

$$a = e + d. \quad (2)$$

From the geometry of FIG. 2 it is seen that:

$$a = \sqrt{d^2 + (s+e)^2} \quad (3)$$

where s is the instantaneous scan location along the image plane. The sign convention for s being s=0 where the reflected optical axis is perpendicular to the image plane, is negative to the left of this point and positive to the right as shown in FIG. 2. In this geometry, b and d are positive constants, a and e are positive variables, $\beta$ is a positive variable angle measured counterclockwise from the optical (focusing lens) axis 12. Equation equations (2) and (3) and solving for distance e gives:

$$e = \frac{s^2}{2(d-s)}, \quad (4)$$

Equation 4 is the first condition for flat field scanning. It says that for any scan distance s, the intercept of the mirror surface with the optical axis of the focusing lens must translate by the distance e.

The second condition for flat field scanning specifies the rotation of the scanning mirror. The geometry of FIG. 2 shows that the tangent of the beam deflection angle $\beta$ is:

$$\tan \beta = -\frac{d}{s+e} \quad (5)$$

Substituting equation (4) into equation (5) gives:

$$\tan \beta = -\frac{2d(d-s)}{s(2d-s)}. \quad (6)$$

Figure 3:
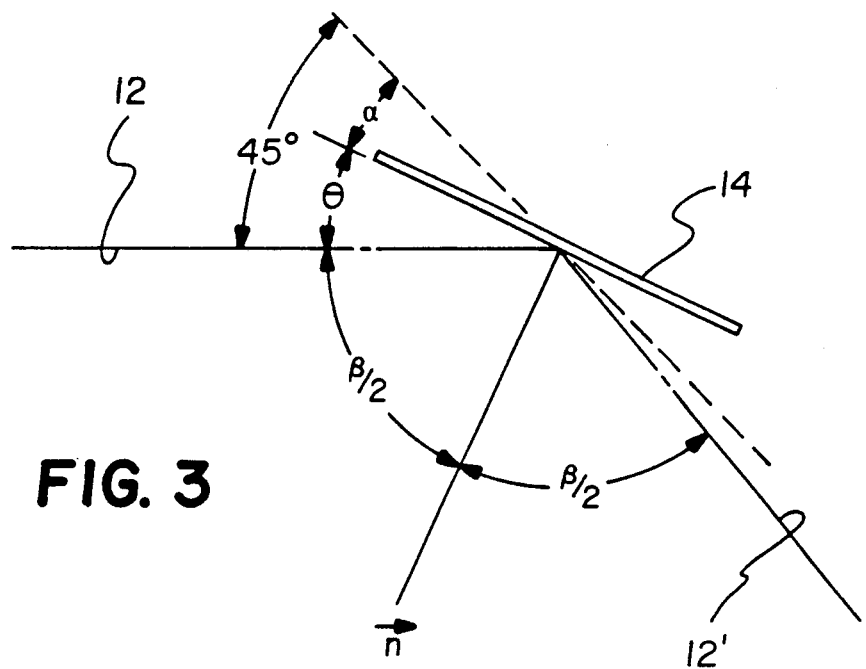
FIG. 3 is a geometric diagram showing the geometry for describing mirror rotation angles for the page scanning mirror.

Next, referring to FIG. 3, we find the angle $\theta$ of the mirror surface with the optical axis 12 of the focusing lens. Since the angle of incidence equals the angle of reflection from the surface of a mirror, the angle between the normal $\bar{n}$ to the mirror surface and the optical axis 12 is $\beta/2$. Therefore, $$\tan \theta = \tan\left(90° - \frac{\beta}{2}\right) = \frac{1 + \cos \beta}{\sin \beta}. \quad (7)$$

Using trigonometric identities, and equation (6)

$$\tan \theta = \frac{d-s}{d}. \quad (8)$$

Finally, it can be seen from FIG. 3 that the mirror rotation angle $\alpha$ from the 45° position is:

$$\alpha = 45° - \theta. \quad (9)$$

The tangent of $\alpha$ is given by the trigonometric identity:

$$\tan \alpha = \frac{1 - \tan \theta}{1 + \tan \theta}. \quad (10)$$

Combining equations (8) and (10) gives:

$$\tan \alpha = \frac{s}{2d - s}. \quad (11)$$

This is the second general condition for flat field scanning. It says that for any scan distance s, the rotation of the mirror surface with respect to its 45° position is $\alpha$. When a scanning apparatus obeys equations (4) and (11), flat field scanning is achieved. It will now be shown that for motion of the scanning mirror pivot axis along a path that lies at 45° to the optical axis, the pivot point moves at a constant velocity to produce a constant velocity scan of the image plane.

Figure 4:
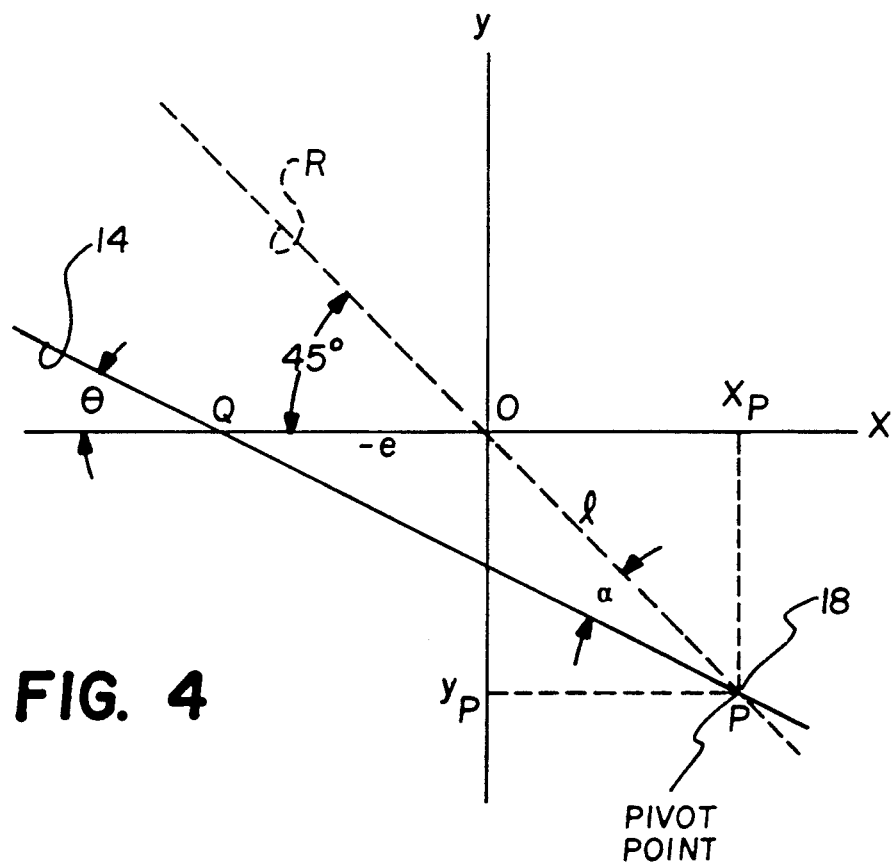
FIG. 4 is a geometric diagram showing the geometry for describing the pivot point locations for the page scanning mirror.

FIG. 4 shows the mirror surface 14 and a 45° reference line R overlayed on a Cartesian coordinate system. The mirror pivot point 18 is located at the intersection of the mirror surface and reference line R as indicated.

The general equation for a straight line that represents the mirror surface 14 is specified by the slope (m) of the line and the x and y coordinates of a point, Q, on that line:

$$y - y_Q = m(x - x_Q). \quad (12)$$

From FIG. 4 we see that:

$$x_Q = -e \quad (13a)$$

$$y_Q = 0 \quad (13b)$$

$$m = -\tan \theta. \quad (13c)$$

Substituting equations (13) into (12) gives the specific straight line equation for the mirror surface 14:

$$y = -(x+e) \tan \theta. \quad (14)$$

The equation for the 45° reference line is:

$$y = -x. \quad (15)$$

By solving equations (14) and (15) simultaneously, we find the coordinates of their intersection point P, which is also the location of the mirror pivot 18. This solution gives:

$$x_p = \frac{e \tan \theta}{1 - \tan \theta} \quad (16a)$$

$$y_p = -\frac{e \tan \theta}{1 - \tan \theta} \quad (16b)$$

Next, we substitute the expression for "e", equation (4) and the expression for tan $\theta$, equation (8), into equations (16a and b). The result is the coordinates of the mirror pivot point given as a function of instantaneous scan location "s":

$$x_p = +\frac{s}{2} ; y_p = -\frac{s}{2}. \quad (17)$$

And the distance "l" of the pivot point from the origin is:

$$l = \sqrt{x_p^2 + y_p^2} = \left(\frac{\sqrt{2}}{2}\right) s. \quad (18)$$

The above equation shows the linear relationship between instantaneous scan location "s" and pivot point location "l".

Also, the time derivative of equation (18) gives the uniform velocity ($V_p$) of the pivot point along the 45° reference line R needed to produce a uniform velocity ($V_s$) of the scan at the focal plane:

$$V_p = \left(\frac{\sqrt{2}}{2}\right) V_s. \tag{19}$$

In the above analysis, it was assumed that the mid scan position was reached when the reflected optical axis 12 was normal to the image plane 16 (see FIG. 1). This is not an optimum choice because the axis will be more strongly inclined to the image plane at the beginning of scan 12' than at the end of scan 12' as shown.

Figure 5:
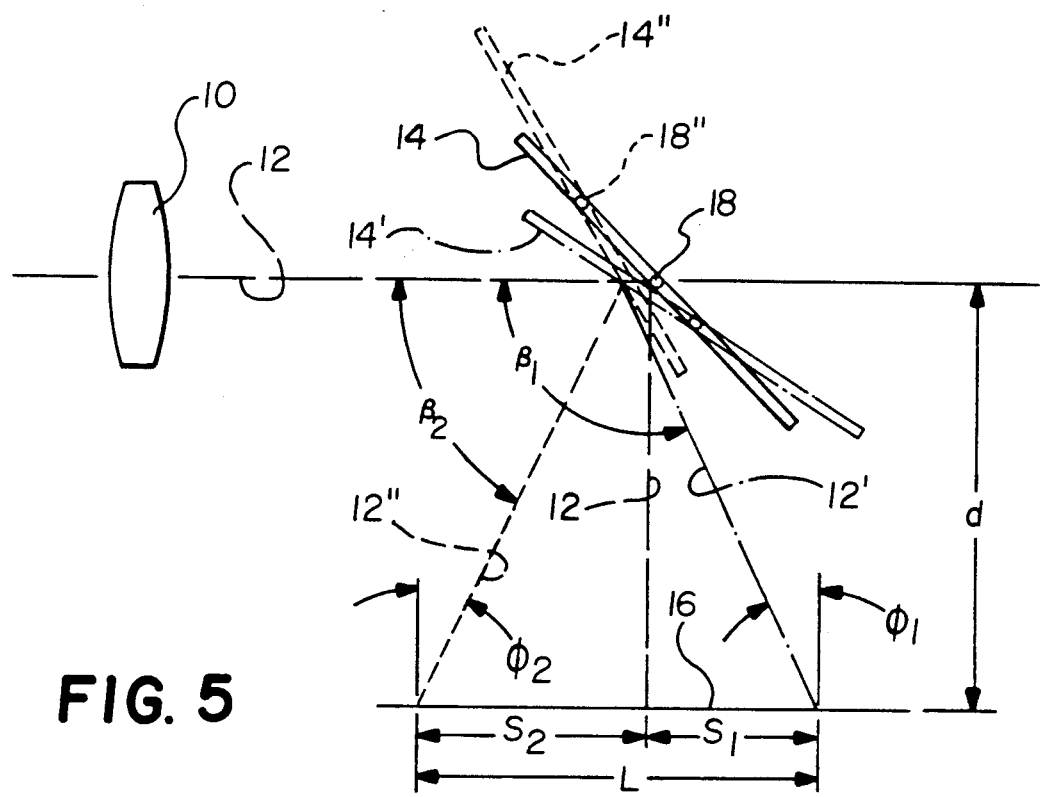
FIG. 5 is a schematic diagram illustrating an alternative embodiment of the present invention.

As shown in FIG. 5, a preferred approach is to design the scanner so that the inclination angles ($\phi_1, \phi_2$) are equal at the beginning-of-scan and end-of-scan. This equal inclination angle condition is achieved when:

$$\tan \beta_1 = -\tan \beta_2 \tag{20}$$

Substituting equation (6) into equation (20) gives:

$$-\frac{2d}{s_1}\left(\frac{d-s_1}{2d-s_1}\right) = \frac{2d}{s_2}\left(\frac{d-s_2}{2d-s_2}\right) \tag{21}$$

The distances "$s_1$" and "$s_2$" locate the beginning and end points of the scan respectively, as shown in FIG. 5. Let the overall scan length be "L". Then, from FIG. 5, we see that:

$$L = S_1 + (-S_2) = S_1 - S_2 \text{ and } S_1 = L + S_2 \tag{22}$$

Substituting equation (22) into equation (21) and solving for the distance "$S_2$" yields the cubic expression:

$$[2]S_2^3 - [3(2d-L)]S_2^2 + [(2d-L^2-2dL]S_2 + [dL(2d-L)] = 0 \tag{23}$$

Numerically solving equation (23) for "$s_2$" and then using equation (22) to find "$s_1$" gives the end points of the scan that corresponds to equal beam inclination angles.

DESIGN EXAMPLE

Figure 6:
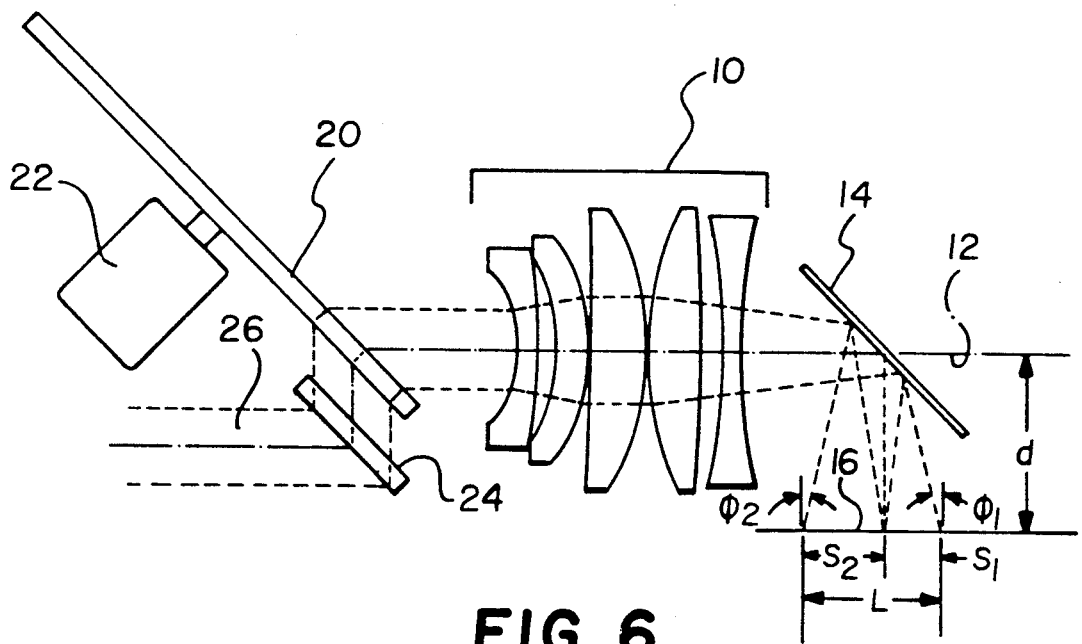
FIG. 6 is a schematic diagram illustrating the use of the present invention in a hologon laser scanner.

A laser scanner shown schematically in FIG. 6 was designed for writing microfiche images. The scanner writes out an 18×14 mm frame onto a stationary section of film. Thus the scanner must generate a raster scan over the image frame.

In the line-scan (18-mm) direction, the scanning motion is produced by a rotating hologon spinner 20 rotated by a high speed motor 22. The page-scan motion over the 14-mm length of the frame is produced by the flat field scanning mirror 14. A fixed grating 24 deflects a laser beam 26 to the hologon spinner 20, and an f-θ lens 10 focuses the laser beam onto the image plane 16.

The distance "d" between the optical axis 12 of the f-θ lens 10 and the image plane 16 is chosen to provide adequate clearance both between the scanning mirror 14 and the f-θ lens 10 and between the f-θ lens 10 and the focal plane 16. For this example, a distance of 18 mm for "d" is used.

The overall scan distance "L" is 14 mm.

With "d" and "L" known, the end points of the scan were calculated using equations (23) and (22). The cubic equation (23) for "$s_2$" can be solved, for example, by means of the SOLVE function built into many programmable calculators. The calculations gives us the values: $s_2 = -8.3132$ mm and $s_1 = +5.6868$ mm.

The beam deflection angles ($\beta$) for the scan end points are calculated from equation (6). Using the values for "$s_1$" and "$s_2$", we found that the deflection angles are: $\beta_1 = 111.251$ degrees and $\beta_2 = 68.749$ degrees. The magnitude of the corresponding beam inclination angle is 90° minus the magnitude of the deflection angle. Thus, at either scan end point, the beam inclination angle ($\phi$) is 21.251 degrees.

Figure 7:
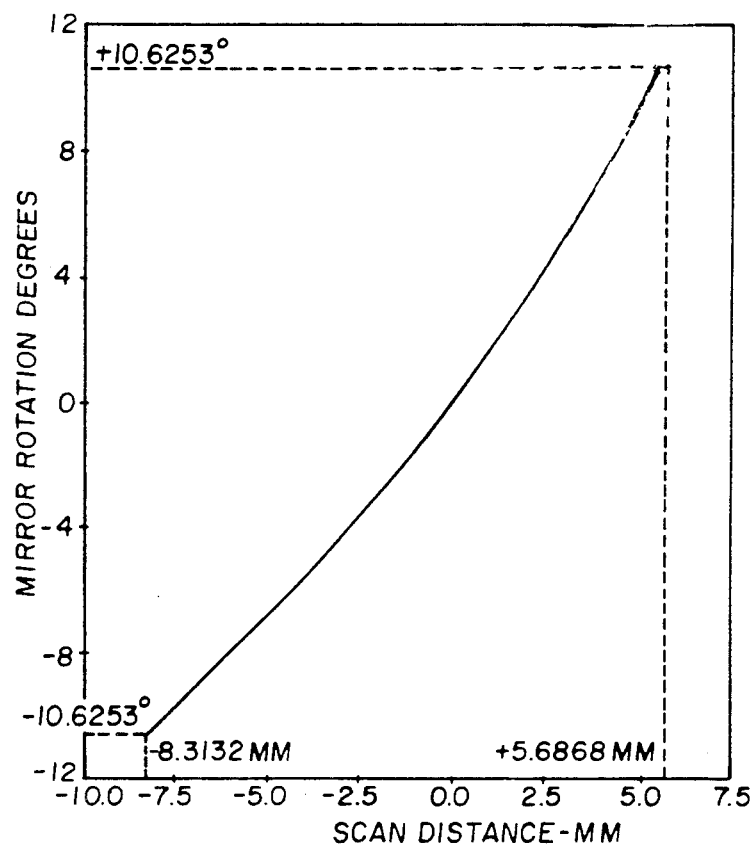
FIG. 7 is a graph showing the relationship between mirror rotation and scanning distance in apparatus according to the present invention.

The required rotation angle ($\alpha$) of the scanning mirror with respect to its 45° position is calculated from equation (11). The rotation angles, plotted as a function of scan distance, are shown in FIG. 7. At the scan end points, the magnitude of the mirror rotation angles are equal: 10.6253 degrees.

The coordinates of the mirror pivot point position for each scan end point are calculated by equation (17). These coordinates are:

For $s = s_1$: $x_1 = +2.8434$ mm
$y_1 = -2.8434$ mm

For $s = s_2$: $x_2 = -4.1566$ mm
$y_2 = +4.1566$ mm

Between these two positions, the scanning mirror is translated at a uniform velocity to provide a uniform scan velocity at the focal plane. For this example, the hologon spinner provides 5800 scans per second in the line-scan direction. In the page-scan direction, the resolution is 11,520 lines per inch. The scan velocity ($V_s$) in the page-scan direction is:

$$V_2 = \frac{5800 \text{ scans/sec}}{11,520 \text{ lines/inch}} = 0.5035 \text{ inches/sec} \tag{24}$$

From equation (19), the scanning mirror translation velocity is 0.3560 inches per second.

A variety of mechanisms can be employed to simultaneously rotate and translate the mirror 14 along the 45° path. A presently preferred embodiment employs a 45° angled track along which the scanning mirror subassembly rids on a carriage. A cam along the track rotates the mirror in a motion corresponding to the curve shown in FIG. 7.

Figure 8:
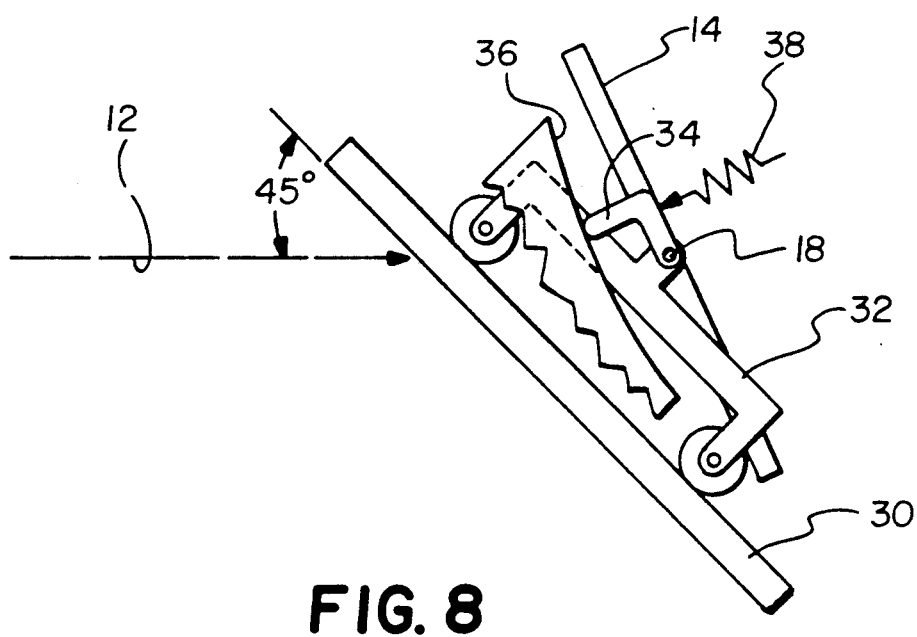
FIG. 8 is a schematic diagram illustrating apparatus for providing simultaneous translation and rotation of a mirror according to the present invention.

FIG. 8 is a schematic diagram of a mechanism for simultaneously translating and rotating the mirror along a track 30 angled at 45° to the optical axis 12 of the focusing lens (not shown). A carriage 32 rides along the track and carries mirror 14 pivoted on axis 18. A cam follower 34 attached to the axis 18 of the mirror 14 is urged into contact with a cam surface 36 by a spring 38 to pivot the mirror as the carriage 32 is moved back and forth along the track 30 by means (not shown) at a constant velocity.

Figure 9:
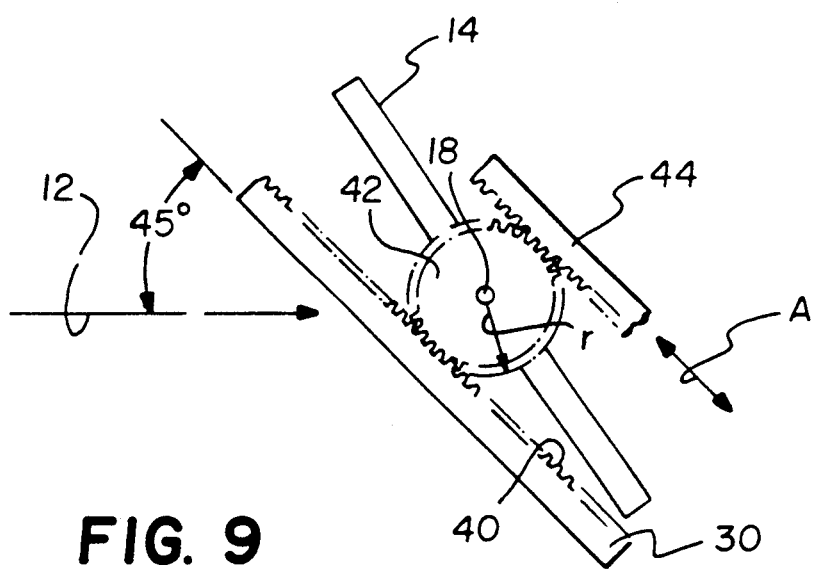
FIG. 9 is an alternative embodiment of apparatus for providing simultaneous rotation and translation of a mirror according to the present invention.

Alternatively, since the relationship between the position along the track and the angular position of the mirror is nearly linear, as shown in FIG. 7, the simultaneous rotation and translation of the mirror along the 45° path may be provided by a rack and pinion arrangement. As shown in FIG. 9, the 45° angled track is provided with a rack of teeth 40. A pinion gear 42 is mounted on the axis 18 of mirror 14 and meshes with the rack 40. A driver 44 engages the pinion gear 42 and is reciprocated in the direction of arrow a to drive the gear back and forth along the rack to provide simultaneous rotation and translation. The radius r of the pinion gear is selected to provide the desired ratio of translation to rotation. It should be noted that the arrangement shown in FIG. 9 is suboptimum since the rotation is not strictly a linear function of translation, as shown in FIG. 7, and will result in some distortion of a scanned image.

INDUSTRIAL APPLICABILITY AND ADVANTAGES

The scanning apparatus disclosed in the present invention is useful in apparatus for scanning images both as input and output scanners for electronic image handling. The apparatus is advantageous in that field of scanning is provided without the need for nonuniform motion of the axis of the scanning mirror, therefore resulting in relatively inexpensive apparatus.

I claim:

1. Optical scanning apparatus for scanning a substantially flat image plane, comprising:
    a. a focusing lens defining an optical axis;
    b. a scanning mirror located between said focusing lens and said image plane; and
    c. means for rotating said scanning mirror about a pivot axis parallel with the scanning mirror to scan said image plane, and for translating said mirror during said rotation such that said pivot axis is translated along a path lying at an angle of 45° to said optical axis.

2. The optical scanning apparatus claimed in claim 1, wherein said means for rotating and translating comprises a rack arranged at an angle of 45° to said optical axis, a pinion connected to said scanning mirror at said pivot axis and riding on said rack, and means for rolling said pinion back and forth along said rack.

3. The optical scanning apparatus claimed in claim 1, wherein said means for rotating and translating comprises a track arranged at an angle of 45° to said optical axis, a carriage for riding on said track, said mirror being mounted on said carriage for rotation about said pivot axis, a cam follower attached to said pivot axis of said mirror, and a cam adapted to be engaged by said cam follower for rotating said mirror about said pivot axis in response to translation of said carriage along said track.

4. The optical scanning apparatus claimed in claim 1, wherein said apparatus scans said image plane from a beginning position to an end position, and wherein the angle between the reflected optical axis and a line normal to said image plane is equal at the beginning and end of said scan.

* * * * *